(12) United States Patent
Chmeiseh et al.

(10) Patent No.: US 11,716,597 B2
(45) Date of Patent: Aug. 1, 2023

(54) METHODS, SYSTEMS, AND APPARATUSES IMPLEMENTING A SEAMLESS MULTI-FUNCTION IN-VEHICLE PAIRING ALGORITHM USING A QR CODE

(71) Applicant: GM GLOBAL TECHNOLOGY OPERATIONS LLC, Detroit, MI (US)

(72) Inventors: Mustafa H. Chmeiseh, Shelby Township, MI (US); Dennis B. Kazensky, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 17/174,314

(22) Filed: Feb. 11, 2021

(65) Prior Publication Data
US 2022/0252410 A1 Aug. 11, 2022

(51) Int. Cl.
*H04B 1/38* (2015.01)
*H04W 4/40* (2018.01)
*H04W 4/80* (2018.01)
*G06K 7/14* (2006.01)

(52) U.S. Cl.
CPC .............. *H04W 4/40* (2018.02); *G06K 7/143* (2013.01); *H04W 4/80* (2018.02)

(58) Field of Classification Search
CPC ........... H04W 4/40; H04W 4/48; H04W 4/80; H04M 1/7253; G06K 7/143
See application file for complete search history.

(56) References Cited

U.S. PATENT DOCUMENTS

| 10,736,159 B2* | 8/2020 | Kim ..................... H04W 48/16 |
| 2010/0241857 A1* | 9/2010 | Okude .................. H04W 12/50 713/168 |
| 2021/0073367 A1* | 3/2021 | Kim ....................... G06F 21/32 |

* cited by examiner

*Primary Examiner* — Tuan Pham
(74) *Attorney, Agent, or Firm* — Lorenz & Kopf LLP

(57) ABSTRACT

In various embodiments, methods, systems, and vehicle apparatuses are provided. A method to selectively pair an in-vehicle display to a mobile device used by a passenger with an in-vehicle display system when seated in the vehicle, including receiving, by a processor of a vehicle, notification via a rideshare app of a request for a ride to a destination; in response, to the passenger entering the vehicle, initiating a pairing operation of a system of the vehicle with a passenger's mobile device based on the capture by the passenger using the passenger's mobile device of a QR code displayed in the vehicle; displaying a QR code for capture by the passenger's mobile device in the vehicle and initiating a wireless connection with the passenger's mobile device wherein the wireless connection is a secure connection based on an identification of the passenger and passenger location in the vehicle based on the QR code.

20 Claims, 7 Drawing Sheets

METHODS, SYSTEMS, AND APPARATUSES IMPLEMENTING A SEAMLESS MULTI-FUNCTION IN-VEHICLE PAIRING ALGORITHM USING A QR CODE

INTRODUCTION

The present disclosure generally relates to vehicle connectivity systems and more particularly relates to methods, systems, and apparatuses for identification, authenticating, and pairing using a Quick Response (QR) code to enable wireless in-vehicle coupling of a passenger's mobile device and corresponding display device in the vehicle.

In recent years there have seen significant advancements in autonomous and semi-autonomous driving features of inland driven vehicles with complex network and host systems that allow more convenience and a better ride experience when conveying passengers. With the advent of autonomous driving vehicles, the passenger has the opportunity to engage in viewing and listening experiences via entertainment and display systems that can be configured in an autonomous vehicle and wirelessly connected to the passenger's mobile device that is carried by the passenger during conveyance by the autonomous vehicle.

Customers often complain about the difficulty and the long-duration of the smartphone pairing processes. It is desirable to use identification and authentication application using QR code data so the passenger's smartphone could cast to the correct display, pair BLUETOOTH® audio headset, and use the Wi-Fi® as well with just scanning the QR code of the display. The result allows a passenger of the car to pair BLUETOOTH®/Wi-Fi® and cast his/her smartphone to in-vehicle entertainment systems in a one scan click operation.

It is desirable to enable a convenient yet secure process for the passenger to connect to display devices within the autonomous vehicle at a time of conveyance (i.e., rideshare) while still maintaining a degree of anonymity for the passenger.

It is desirable to be able to enable connectivity with the passengers mobile device without the passenger having to manually enter pairing codes while still enabling identification and authenticating information transferred or enabling a handshake between a passengers' mobile device and the network system integrated with the autonomous vehicle for at least during the time of conveyance of the passenger.

It is desirable to have a system design that is capable of securely identifying a passenger's mobile device for connection and to prevent unauthorized personnel from otherwise accessing and causing a misconfiguration of a vehicle system and/or the passenger's mobile device.

It is desirable to utilize profile sharing information contained in a user profile in a ride-sharing or the like app in authentication and identification in a seamless pairing operation with an in-vehicle communication system and a passenger's mobile device to enable a seamless pairing operation without needing to (and eliminating a manual input step) input corresponding key codes to pair both devices.

It is desirable to temporally use passenger related profile data and associated identification data in the pairing operation and to erase all passenger identification like data after a rideshare or other conveyance by an autonomous vehicle to maintain passenger privacy and security.

It is desirable to provide a contactless process for QR code data that is transferable for pairing to prevent virus transmission during a pandemic (via human contact with touch screens) and to both ensure confidence and maintain rider safety in a rideshare experience.

Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment, a method to selectively pair an in-vehicle display to a mobile device used by a passenger with an in-vehicle display system when seated in the vehicle. The method includes receiving, by a processor of a vehicle, notification via a rideshare app of a request for a ride to a destination; in response, to the passenger entering the vehicle, initiating a pairing operation of a system of the vehicle with a passenger's mobile device based on a capture by the passenger using the passenger's mobile device of a Quick Response (QR) code displayed in the vehicle; displaying, by a processor of a vehicle, at a display device selected from a plurality of display devices in the vehicle a QR code for capture by the passenger's mobile device in the vehicle wherein the QR code displayed is at a select display device positioned in a direct view of a seated passenger within a predetermined distance that enables the passenger to operate the mobile device to capture the QR while in a seated position at an interior location in a vehicle; in response to the passenger capturing using an app host by the passenger's mobile device, initiating, by the processor, a wireless connection with the passenger's mobile device wherein the wireless connection is a secure connection based on an identification of the passenger and passenger location in the vehicle based on the QR code; pairing, by the processor, the vehicle system with the mobile device of the passenger to initiate a Wi-Fi protocol communication for multi-casting a display from a media player hosted by the passenger's mobile device on the select display in the vehicle based on the QR code; pairing, by the processor, the vehicle system with the mobile device of the passenger to initiate a BLUETOOTH protocol communication for audio presentation on the passenger's mobile device based on the QR code; and disengaging, by the processor, both Wi-Fi and BLUETOOTH protocol communication when the passenger departs from the vehicle.

In at least one exemplary embodiment, the method includes determining, by the processor, that the passenger is departing the vehicle by data of a destination location of the vehicle based on GPS data generated by the passenger's mobile device.

In at least one exemplary embodiment, the method includes determining, by the processor, that the passenger is departing the vehicle by data of the destination location of the vehicle based on navigation data received by the passenger's mobile device.

In at least one exemplary embodiment, the method includes implementing, by the processor, based on information contained in the QR code a push connect operation for casting to the display device without a passenger select of the display device to viewed casted content.

In at least one exemplary embodiment, the method includes configuring, by the processer, the QR code in a manner to enable a passenger to scan the QR within an intimate distance to the passenger that does not interfere with the intimate distance of any other passenger seated in the vehicle wherein the intimate distance is determined within an arms' reach of the passenger.

In at least one exemplary embodiment, the method includes enabling, by the processor, a priority to connect either the Wi-Fi or the BLUETOOTH connection to the passenger mobile device with the in-vehicle system.

In at least one exemplary embodiment, the method includes notifying, by the processor, the passenger by a message displayed on the passenger's mobile device that the Wi-Fi and BLUETOOTH connection is enabled.

In another exemplary exemplary embodiment, a system to selectively pair an in-vehicle display to a mobile device used by a passenger with an in-vehicle display system when seated in the vehicle is provided.

In at least one exemplary embodiment, the system includes a processor configured to execute an in-vehicle system by an algorithm that implements an app to: seamlessly operate a push connection to wirelessly connect to a passenger mobile device to enable casting of the passenger mobile device to a select display in the vehicle based on information contained in a QR code transferred to the passenger mobile device; in response, to a passenger entering the vehicle, initiate a pairing operation of the in-vehicle system with the passenger mobile device based on a manual capture by the passenger using the app of a QR code displayed in the vehicle; display at a display device selected from a plurality of display devices in the vehicle a QR code for capture by the passenger mobile device at a select display device positioned in a direct view of a seated passenger within a predetermined distance that enables the passenger to operate the passenger mobile device to capture the QR while in a seated position at a location in a vehicle; in response to a passenger capture of the QR code using the app hosted by the passenger's mobile device, initiate a wireless connection with the passenger's mobile device wherein the wireless connection is a secure connection based on an identification of the passenger and passenger location in the vehicle based on the QR code; pair the vehicle system with the mobile device of the passenger to initiate a Wi-Fi protocol communication for multi-casting a display from a media player hosted by the passenger's mobile device on the select display in the vehicle based on the QR code; pair the vehicle system with the mobile device of the passenger to initiate a BLUETOOTH protocol communication for audio presentation on the passenger's mobile device based on the QR code; and disengage both Wi-Fi and BLUETOOTH protocol communication when the passenger departs from the vehicle.

In at least one exemplary embodiment, the system includes determine that the passenger is departing the vehicle by data of a destination location of the vehicle based on navigation data received by the passenger mobile device.

In at least one exemplary embodiment, the system includes determine that the passenger is departing the vehicle by data of the destination location of the vehicle based on navigation data received by the passenger mobile device.

In at least one exemplary embodiment, the system includes implement by the information of the QR code a push operation to connect to cast content of the passenger mobile device to the display device.

In at least one exemplary embodiment, the system includes configure the QR code to enable a passenger to scan the QR within an intimate distance of the passenger that does not interfere with the intimate distance of any other passenger seated in the vehicle wherein the intimate distance is determined as a distance no more than an arm's reach of the passenger.

In at least one exemplary embodiment, the system includes enable a priority to connect the Wi-Fi or the BLUETOOTH connection to the passenger mobile device with the in-vehicle system.

In at least one exemplary embodiment, the system includes the processor configured to notifying the passenger by a message displayed on the passenger's mobile device that the Wi-Fi and BLUETOOTH connection is enabled.

In another exemplary embodiment, a vehicle apparatus is provided.

In at least one exemplary embodiment, the vehicle apparatus includes a vehicle controller including a processor wherein the processor implements an algorithm to: execute an in-vehicle system to seamless push connect to a passenger mobile device for enabling casting to a select display in the vehicle based on information generated in a QR code transferred to the passenger mobile device; in response, to the passenger entering the vehicle, initiate a pairing operation of systems of the vehicle based on a capture of a QR code displayed in the vehicle; display at a display device selected from a plurality of display devices in the vehicle a QR code for capture by a mobile device used by a passenger in the vehicle wherein the QR code displayed is at a select display device positioned in a direct view of the seated passenger within a predetermined distance that enables the passenger to the mobile device to capture the QR while in a seated position at a location in a vehicle; in response to the passenger capturing the QR code by the passenger's mobile device, initiate a wireless connection with the passenger's mobile device wherein the wireless connection is a secure connection based on an identification of the passenger and passenger location in the vehicle based on the QR code; pair the passenger's mobile device to initiate a Wi-Fi protocol communication for multi-casting a display from a media player hosted by the passenger's mobile device on a select display in the vehicle based on the QR code; pair the passenger's mobile device to initiate a BLUETOOTH protocol communication for audio presentation on the passenger's mobile device based on the QR code; and disengage both Wi-Fi and BLUETOOTH protocol communication when the passenger departs from the vehicle.

In at least one exemplary embodiment, the vehicle apparatus includes the processor configured to: determine that the passenger is departing the vehicle by data of a destination location of the vehicle based on navigation data received by the passenger mobile device.

In at least one exemplary embodiment, the vehicle apparatus includes the processor configured to: determine that the passenger is departing the vehicle by data of the destination location of the vehicle based on navigation data received by the passenger mobile device.

In at least one exemplary embodiment, the vehicle apparatus includes the processor configured to: implement by the information of the QR code push connect for casting to the display device.

In at least one exemplary embodiment, the vehicle apparatus includes the processor configured to: enable a priority to connect either the Wi-Fi or the BLUETOOTH connection to the passenger mobile device with the in-vehicle system.

In at least one exemplary embodiment, the vehicle apparatus includes the processor configured to: enable a priority to connect the Wi-Fi or the BLUETOOTH connection to the passenger's mobile device with the in-vehicle system.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
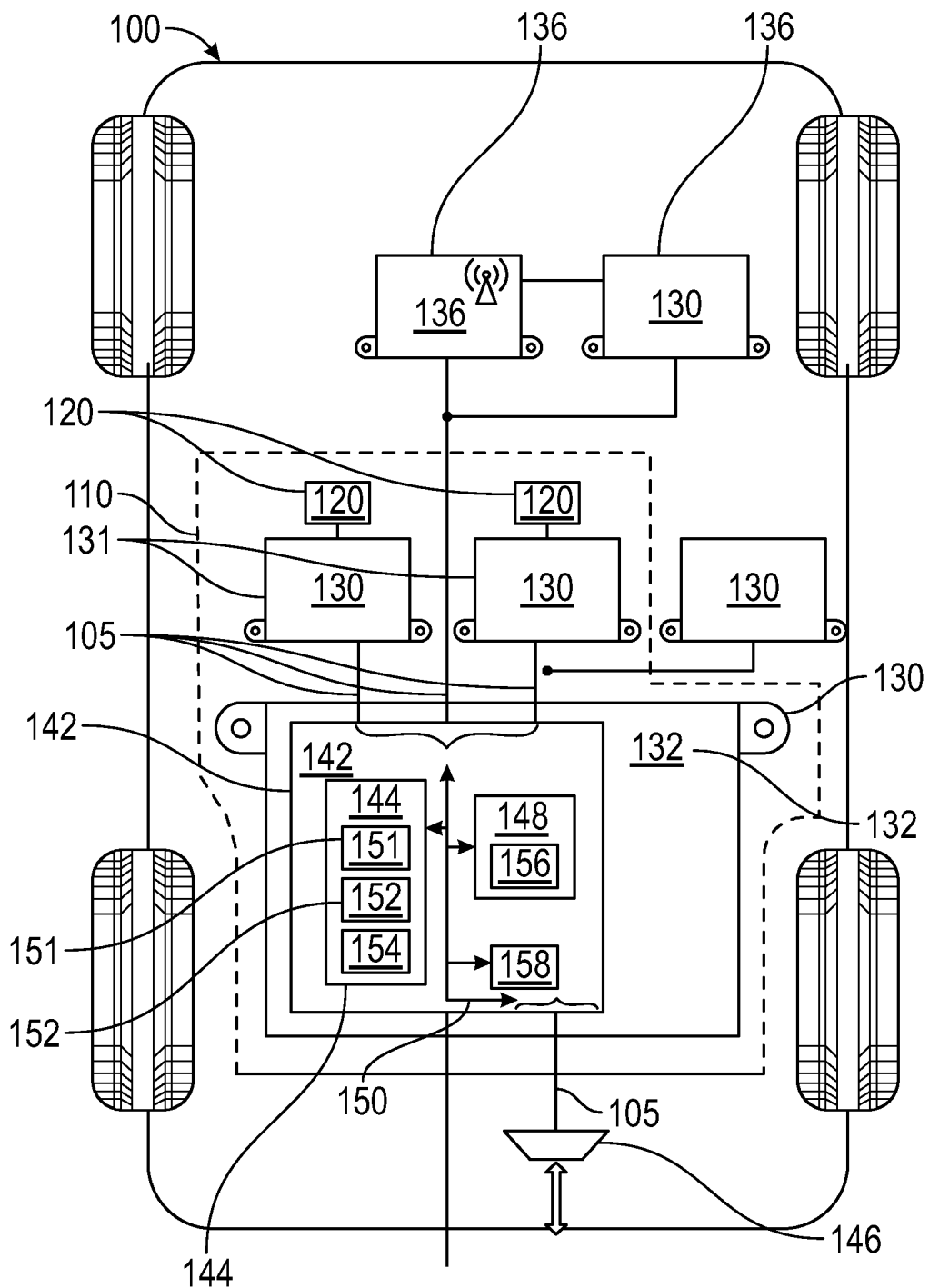
FIG. 1 illustrates a functional block diagram of an autonomous or semi-autonomous vehicle having a multi-functional pairing algorithm that enables control of vehicle communication systems to configure seamless wireless connections with a mobile device of the passenger using an app platform requesting a conveyance, rideshare, or other transportation requests to enable multicasting of video or the like found on the passengers mobile device with a designated in-vehicle display by the passengers mobile device capturing a QR code displayed in accordance with exemplary embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. Also, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. determining, by the processor, that the passenger is departing the vehicle by data of the destination location of the vehicle based on navigation data received by the passenger mobile device.

In various exemplary embodiments, the present disclosure describes methods, systems, and apparatuses, that leverage identification and authentication application data using Quick Response (QR) code so the passenger's mobile device (i.e., smartphone or the like) can cast to a correct display of multiple displays within a vehicle, enable an automated push pairing to a BLUETOOTH® connectable audio headset of the passenger and for use of the vehicle's Wi-Fi® network to connect with the vehicle's display by a scanning (i.e., seamless push automated connection) of the displayed QR code in the vehicles' display device.

In various exemplary embodiments, the present disclosure describes methods, systems, and apparatuses that enable a passenger when inside a vehicle to pair BLUETOOTH®/Wi-Fi® and cast the passenger's smartphone or the like to in-vehicle configured entertainment systems in a single scan operation without the passenger having to manually input a pairing code.

While the present disclosure describes pairing operating using a QR code, however the use of other two dimensional barcodes are also contemplated. For example, the use of NFC tags, and SnapTags may also be deemed feasible. That is, the present disclosure is not limited to QR codes or two dimensional bar codes for enabling a pairing operation.

FIG. 1 is a functional block diagram illustrating an autonomous or semi-autonomous vehicle having a multi-functional pairing algorithm that enables control of vehicle communication systems to configure seamless wireless connections with a mobile device of the passenger using an app platform requesting a conveyance, rideshare, or other transportation requests to enable multicasting of video or the like found on the passengers mobile device with a designated in-vehicle display by the passengers mobile device capturing a Quick Response (QR) code displayed in accordance with exemplary embodiments.

In an exemplary embodiment, the autonomous vehicle 100 may be configured as a model autonomous vehicle that may itself be configured in a multitude of ways. For example, the model autonomous vehicle can be configured as a six-passenger, autonomous, electric, SUV-sized configured vehicle where each passenger has his/her display for viewing for a set of multiple displays in the vehicle's interior (i.e. there are about six or more positioned displays for viewing by each passenger vehicle, where each of the passengers is seated facing each other in two rows of seats). In this example, the model autonomous vehicle may be configured with two sets of sliding doors on either side of the vehicle that opens from a center similar to a tram vehicle that creates an entrance that is approximately three times the size of a conventional door opening, with a low load floor to allow for easier entrance and exiting by the passengers. Consistent with the automated entering, convenience is paramount; for example, while the doors are fully automated with sensors instruct the passengers' doors when to open and close, the doors are also operable manually or through an app on a passenger's mobile device. Leveraging on the use of the app and the knowledge of the linking of the app to the vehicle, the passenger is made aware that a displayed QR code can provide the pairing connection to entertainment and other systems of the vehicle. Hence, upon seating, the passenger not only views the display or screen in front of the passenger which provides route information to the passenger, the passenger by viewing the QR code within the displayed route information can know by scanning the QR can cast to the display seamlessly. While the model autonomous vehicle is described with certain features, it is contemplated that the configuration is not limiting to this design, and a variety of different vehicle configurations is permissible with a preference for personalized display screens for viewing by each passenger. Alternately, display screens can be configured for multiple passengers but still with display capability for QR codes for pairing operations with a passenger's mobile device.

While it is contemplated that the disclosed subject matter is implemented in systems of an autonomous vehicle 100 other ways of deploying the disclosed subject are also feasible. For example, it is entirely possible for the subject matter to be deployed in or integrated into systems or equipment of other types of vehicles that may or may not be autonomous or remote devices such as drones.

With a reference to FIG. 1, the autonomous vehicle 100 having a network 105 (i.e. an all in-vehicle network) self-configuration processor system (inputs, ECU flags, vehicle states, ECUs, Sensors and sensor data, calibration data, etc. . . . ) 110 is shown in accordance with exemplary embodiments. The autonomous vehicle 100 includes a plurality of sensors 120, sensor ECUs 131, general ECUs 130, and a network module 132 of a network configuration processor system 110. In an exemplary embodiment, the network configuration processor system The sensors sense observable conditions of the autonomous vehicle 100 and can include, but are not limited to, image, LIDAR, and radar sensors 120. Generally, each sensor of the plurality of sensors is specifically is coupled to the network self-configuration processor module (communication gateway controller) 132 of the autonomous vehicle 100 and configured to sense external surroundings of the autonomous vehicle 100. The network self-configuration processor module 132 receives sensor signals generated by the sensors 120 and provided by sensor ECUs 131, processes the sensor signals to obtain sensor data. Although the depicted embodiment realizes a platform as an autonomous vehicle 100, the concepts presented here can be deployed in other platforms, such as aircraft, spacecraft, watercraft, motorcycles, robots, robotic devices, and the like. Moreover, the concepts presented here may also be deployed in alternative mobile and non-mobile platform applications, if so desired.

As mentioned, the autonomous vehicle 100 generally includes a plurality of sensors 120, sensor ECUs 131, general ECU devices 130, and software, sufficient for ingesting digital information and/or sensing information, converting the sensed information into digital information, and providing the digital information to the network self-configuration processor system 110. Generally, each sensor of the plurality of sensors is configured to sense aspects of the surroundings of the autonomous vehicle 100.

Outside of the manufacturing context, the network self-configuration processor system 110 if configured, can allow data to be exfiltrated via 136 if in a designated region, and also incorporate additional consumer approval as an additional input to permit data collection. The transceiver 136 can be used to establish and maintain the communications links to onboard components and external communication sources to be used to provide additional data, such as connecting the BLUETOOTH® and Wi-Fi® to the passenger's mobile device. The transceiver 136 can perform signal processing (e.g., digitizing, data encoding, modulation, etc.) as is known in the art and this instance for the temporal data received sent, and received.

With continued reference to FIG. 1, the components of the network self-configuration processor system 110 and their functions are described. In the depicted embodiment, the computer system of the network self-configuration processor system 110 includes networks 105, ECUs 130, an extra vehicle communication interface 146, and a communication gateway controller 132 with a block data processor 142 communicatively coupled to a memory 144, a storage device 148, an interprocessor bus 150, and an optional storage disk 158. In various embodiments, the network self-configuration processor system 110 performs actions and other functions described further below in connection with FIGS. 2-7. The block data processor 142 performs the computation and control functions attributed to the network self-configuration processor system 110 and may include any type of module or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the block data processor 142 loads and executes one or more programs, algorithms, and rules embodied as instructions and applications (i.e. the learning algorithm) 152 contained within the memory 144 and, as such, controls the general operation of the control system of the communication gateway controller 132. In executing the processes described herein, the block data processor 142 loads and executes at least a program 156.

A computer-readable storage medium, such as a memory 144, a storage device 148, or an optional storage disk 158 may be utilized as both storage and a scratchpad. The memory locations where data bits are maintained are physical locations that have particular electrical, magnetic, optical, or organic properties corresponding to the data bits. The memory 144 can be any type of suitable computer-readable storage medium. For example, memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the block data processor 142. In the depicted embodiment, the memory 144 stores the above-referenced instructions and applications 152 along with one or more configurable variables in stored values 154.

The storage device 148 is a computer-readable storage medium in the form of any suitable type of storage apparatus, including direct access storage devices such as hard disk drives, flash systems, floppy disk drives, and optical disk drives. In one exemplary embodiment, the storage device 148 includes a program product from which memory 144 can receive a program 156 that executes one or more embodiments of one or more processes of the present disclosure. In another exemplary embodiment, the program product may be directly stored in and/or otherwise accessed by the memory 144 and/or a disk (e.g., optional storage disk 158), such as that referenced below.

The data records may be stored in the computer-readable storage medium, such as the memory 144, the storage device 148, or the optional storage disk 158. The internal buses 150 of 132 serve to transmit programs, data, status, and other information or signals between the various components of the computer system of the network self-configuration processor of system 110. The bus 150 can be any suitable physical or logical means of connecting computer systems and components. This includes, but is not limited to, direct hard-wired connections, fiber optics, infrared and wireless bus technologies. During operation, program 156, stored in memory 144, is loaded and executed by the block data processor 142.

The interface 146 may also include one or more network interfaces to allow 110 to communicate with external mobile devices, and/or manufacturing systems to permit communication with and potential storage of state information which ultimately can be placed into storage apparatuses, such as the storage device 148

In various embodiments, autonomous vehicle 100 is autonomous or semi-autonomous, and the control system of the communication gateway controller 132, and/or components thereof, are incorporated into the autonomous vehicle 100. The autonomous vehicle 100 is, for example, a vehicle that is automatically controlled to carry passengers from one location to another. The autonomous vehicle 100 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

Figure 2:
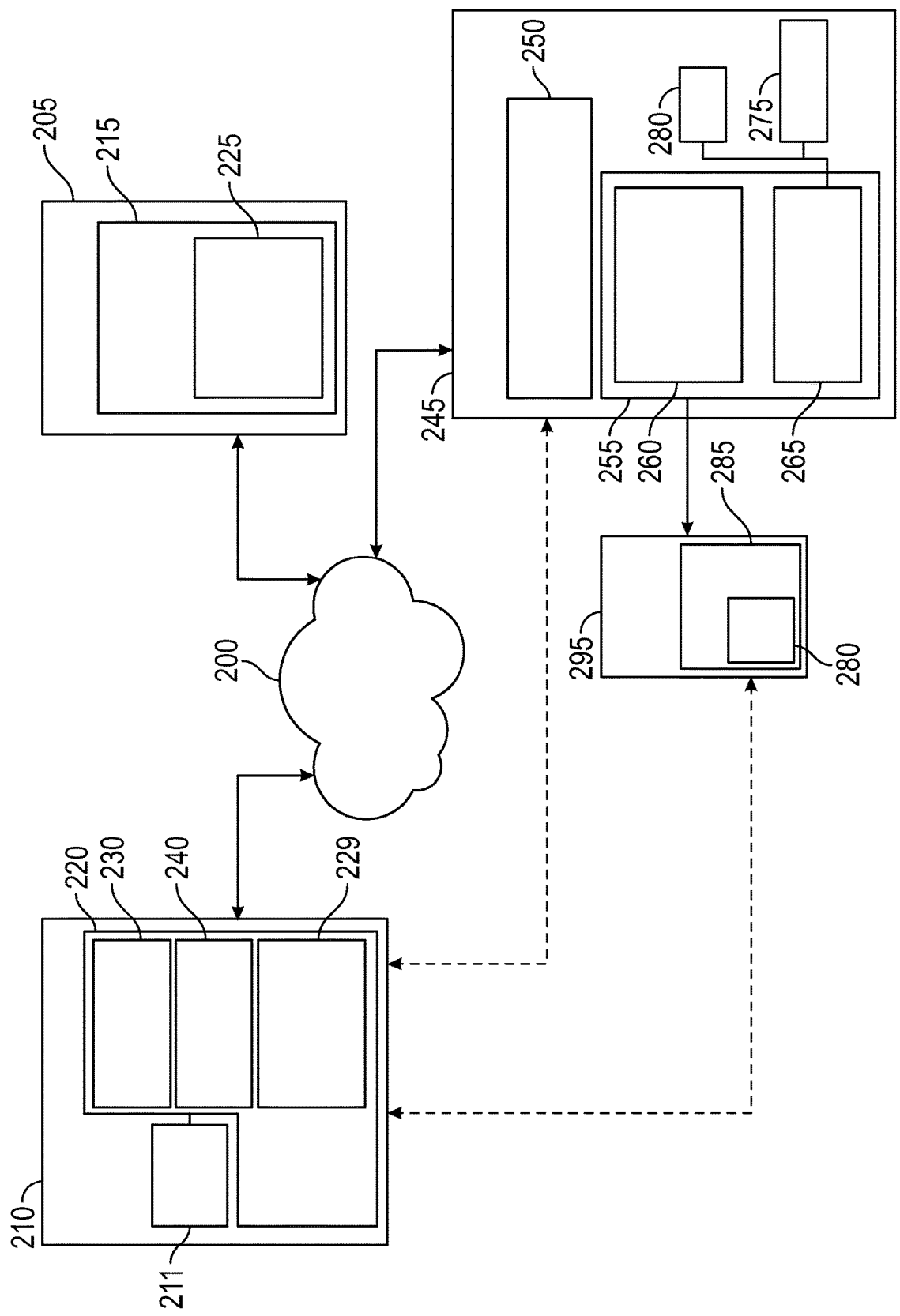
FIG. 2 illustrates an exemplary diagram of the communication architecture of the passengers' mobile device, in-vehicle communication systems, and cloud/back-end server supporting the app platform for the ride request by the passenger of the seamless multi-function pairing app system in accordance with an embodiment.

FIG. 2 illustrates an exemplary diagram of the communication architecture of the passengers' mobile device, in-vehicle communication systems, and cloud/back-end server supporting the app platform for the ride request by the passenger in accordance with an embodiment. In FIG. 2, there is shown a mobile device 210 configured with a media player 211 for playing video content for casting to display device 295, a mobile client 220 that hosts a seamless pairing (multi-function) app 229, a scanning app 230, and a rideshare request app 240. The seamless pairing app 229 may be configured as an in-app with the ride-sharing request app 240. In an exemplary embodiment, as an example, the scanning app 230 can be configured as an in-app 230 of the seamless pairing app 229 or a separate app. The seamless pairing app 229 is configured to operate with functionalities of the ride-sharing request app 240 to request an autonomous vehicle 100 and the other apps such as the scanning app 230 to scan a displayed QR code displayed in the autonomous vehicle 100 for point and capture by the passenger of the QR code displayed on rideshare. Further, in FIG. 2 the mobile device 210 is connected to a network via the network cloud 200 and to a cloud server 205, which is configured with a cloud platform 215 that contains a server-based rideshare app 225 and related apps. The mobile device 210 can download the seamless pairing app 229 from an app store or app marketplace including GOOGLE® PLAY™, AMAZON® Appstore, APPLE® AppStore, etc. . . . The server-based rider share app 225 can receive prior profile information about the passenger making the rideshare request from the mobile device 210 as well as GPS information, and metadata about the route and destination requested through various navigation apps.

In an exemplary embodiment, the GM® ONSTAR™ app can be integrated with the seamless pairing app 229 to provide passenger profile information that has been prior inputted by the passenger into the GM® ONSTAR™ app during configuration. Additionally, route information may also be available via the GM® ONSTAR™ for monitoring the passenger conveyance in the rideshare and for enabling the erasure of passenger identification and authentication information (i.e., metadata about the passenger) used in the conveyance by a multi-function pairing app 260 of the vehicle system.

In an exemplary embodiment, the in-vehicle (i.e., entertainment communication, and/or networking system) system 245 may be configured with a transmitter/receiver (i.e. transceiver) 250 for monitoring for the capture of the QR code information by the passenger mobile device 210 and to initiate the pairing operation with the passenger mobile device 210. The in-vehicle system 245 is also configured with the (multi-function) pairing app 260 hosted on an in-vehicle platform 255 coupled to a multi-cast app 265 for displaying video content once the pairing operation has been completed with the display device 295. The in-vehicle platform 255 is also in communication with a Wi-Fi® module 280, a BLUETOOTH® module 275 for connecting both wireless protocols to the passenger mobile device 210. Further, platform 255 enables the multi-casting from the multi-cast app 265 to the display device 295 and also the display of the QR code 280 in a graphic user interface 285 displayed on the display device 296.

In an exemplary embodiment, the QR code 280 that is captured by the passenger mobile device 210 contains identification information about which display device 205 that the multicast app 265 is to be coupled to display with the video or other content on the passenger mobile device 210.

In an exemplary embodiment, other view content can be multicast on the display device including enabling communication apps such as ZOOM®, MICROSOFT® TEAMS™, WEBEX®, GOOGLE® HANGOUTS®, SNAPCHAT® for audio and video pairing with the passenger mobile device 210. In various exemplary embodiments, the pairing can be initiated for the Wi-Fi via the Wi-Fi module 280 and BLUETOOTH® via the BLUETOOTH® module 275 of the vehicle system 245.

Figure 3:
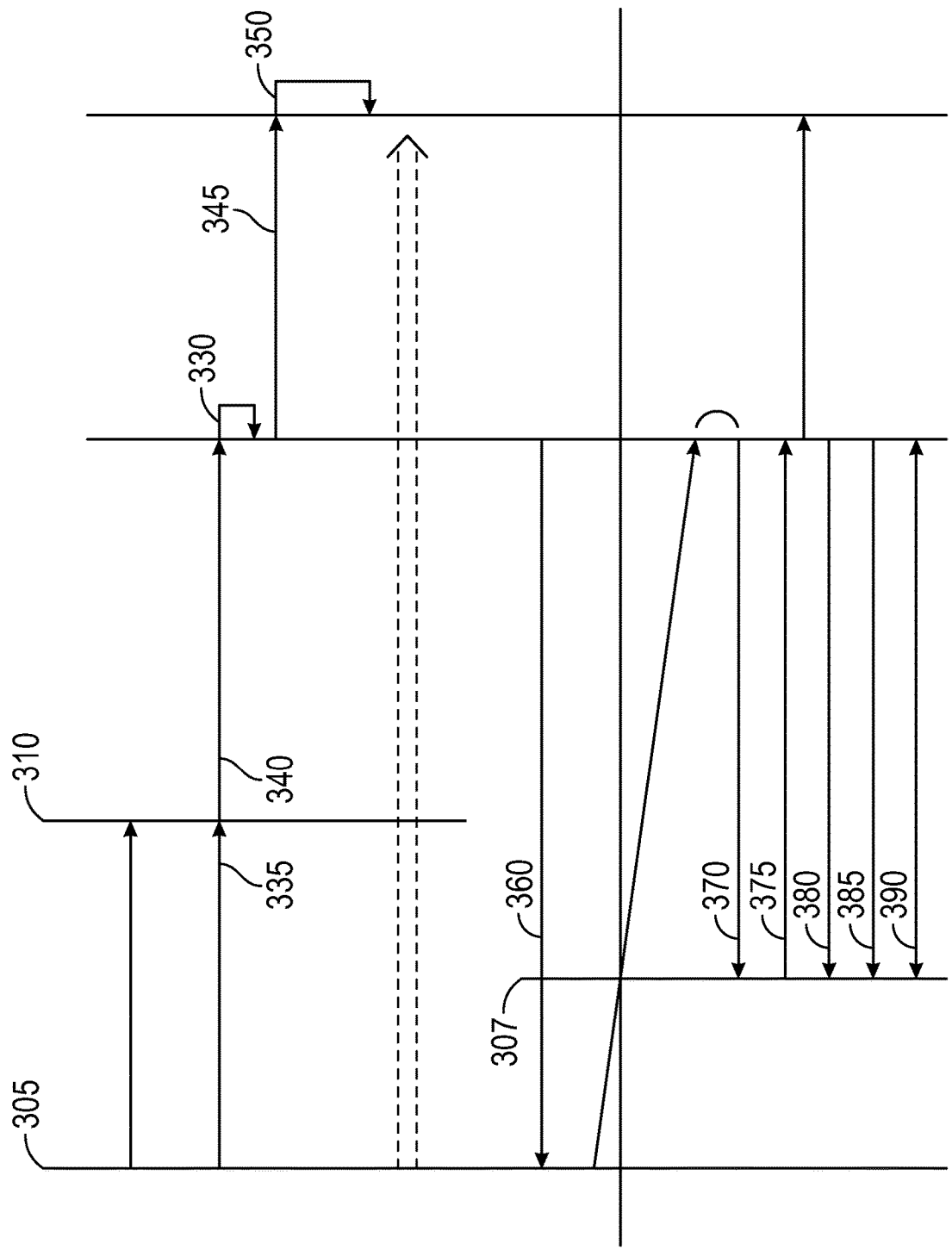
FIG. 3 illustrates an exemplary diagram of requests and responses between a rideshare app hosted on a passenger's mobile device, a server, and a vehicle, and multicast to an in-vehicle display device of the seamless multi-function pairing app system in accordance with an embodiment.

FIG. 3 illustrates an exemplary diagram of requests and responses between a rideshare app hosted on a passenger's mobile device, a server, and a vehicle, and multicast to an in-vehicle display device of the seamless multi-function app pairing system in accordance with an embodiment. In FIG. 3, a passenger may initially set up profile information at a rideshare app 305 or the profile information may already be available via other vehicle association apps such as GM® ONSTAR that can be permissibly made accessible to the rideshare platform at the server app 310. In any event, profile information about the passenger is set to the rideshare server app 310, and metadata about the passenger and passenger's mobile device hosting the rideshare app is received at an in-vehicle app 315. Upon the passenger being picked up for a conveyance to a destination location, a QR code is generated at step 345 for display on the in-vehicle display device 320. At step 350, a capture operation is executed where the passenger's mobile device using the rideshare app 205 or an associated scanning app, captures the QR code generated by pointing and capturing the QR while inside the autonomous vehicle. In an exemplary embodiment, the QR code is configured of a size and shape that is easily scannable or capturable by the passenger when seated with minimal stretching and positioning of the mobile device's camera (i.e., within an intimate passenger's distance for mobile device capture operation). That is, the display device 320 is positioned in a manner in direct view for the passenger (i.e., appropriate angle and direction), and the QR code is displayed via a graphic user interface on the display so that the passenger can point and capture using the mobile device's camera without having to enter the personnel or intimate space, or with entering a very limited amount of the personal space of another passenger seated in the autonomous vehicle. In addition, the display device 320 is positioned in a manner in front or to the side of the passenger so that when the passenger points and captures the QR code, the passenger is not capturing or to a limited extent capturing any other passenger image (to maintain passenger privacy) in the rideshare vehicle. Hence, the position of the display device and the capture by the mobile device of the QR code in the display device is configured to protect the privacy of another seated passenger and to prevent the inadvertent capture of the passenger whilst scanning or capturing the QR code.

Next, once the QR code has been captured via a scanning operation by the passenger's mobile device, the QR is generated to include metadata about the display that has been selected by the passenger because the passenger has chosen to capture the QR code displayed on a certain monitor of a set of monitors in the autonomous vehicle. That is, implicit to the passenger point and scanning of the QR code, is also the decision to select that particular monitor. At step 350, the passenger scans the QR code from a seated or situated position in the autonomous vehicle. At step 365, the pairing app 315 receives the identification information via the profile information of the passenger and performs an authentication of the passenger's mobile device and also a selection of the monitor for a multicast operation by the passenger's mobile device. At step 370, the pairing operation once the authentication is verified is initiated by the in-vehicle pairing app 315. The in-vehicle pairing app 315, pairs at step 370 the in-vehicle system to via the passenger mobile device pairing app 307 to form a connection via a Wi-Fi® protocol. In response to the-fi connection between the mobile device and the vehicle system (e.g. a vehicle entertainment system), the passenger mobile device pairing app 307 sends via multicast functionality the multicast video to been viewed on the in-vehicle display device by the passenger at step 375. The multicast connection is initiated and completed seamlessly without the passenger having to input a particular display number or make a display device selection for viewing. In other words, the common step for user selection of a display for displaying a multicast video from a mobile device is eliminated, and the video content or viewing experience is completed immediately after the capture of the QR code. In response to the completion of the multicast connection, a BLUETOOTH® connection is requested at step 380. Then at step 390, the server ridesharing app deletes or erases any personal identification information locally used to verify the passenger on the conveyance for privacy and security.

Figure 4:
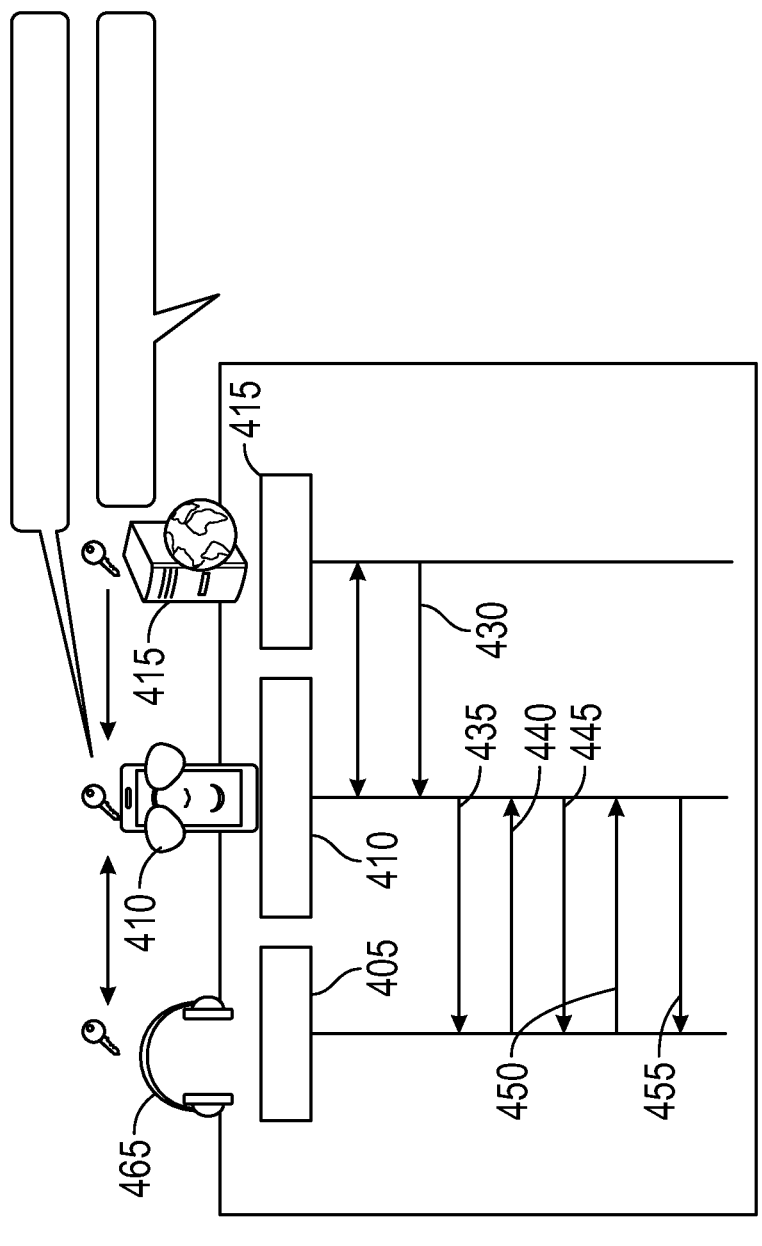
FIG. 4 illustrates an exemplary diagram of the connectivity between the audio device, the mobile device, and the server of the seamless multi-function pairing app system in accordance with an embodiment.

FIG. 4 is an exemplary diagram of the connectivity between the audio device, the mobile device, and the server of the seamless pairing system in accordance with an embodiment. In FIG. 4, the mobile device 410 configures a pair connection to server 415, the server 415 is located in the cloud (i.e., at the back office). At step 425, the mobile device 410 authenticates a connection to server 415. At step 425, server 415 share various parameters for identification and for creating a temporary id and session connection between the mobile device 410. At step 435, the id parameters are exchanged between the mobile device and audio device 405 to create the BLUETOOTH® connection. At step 440, the challenge-response is sent to complete the pairing operation. At step 450, the response to the challenge is received (i.e. affirmation) and the connection is completed. At step 455, a counter or other parameter is updated to ensure authentication and a secure connection between the paired connection.

Figure 5:
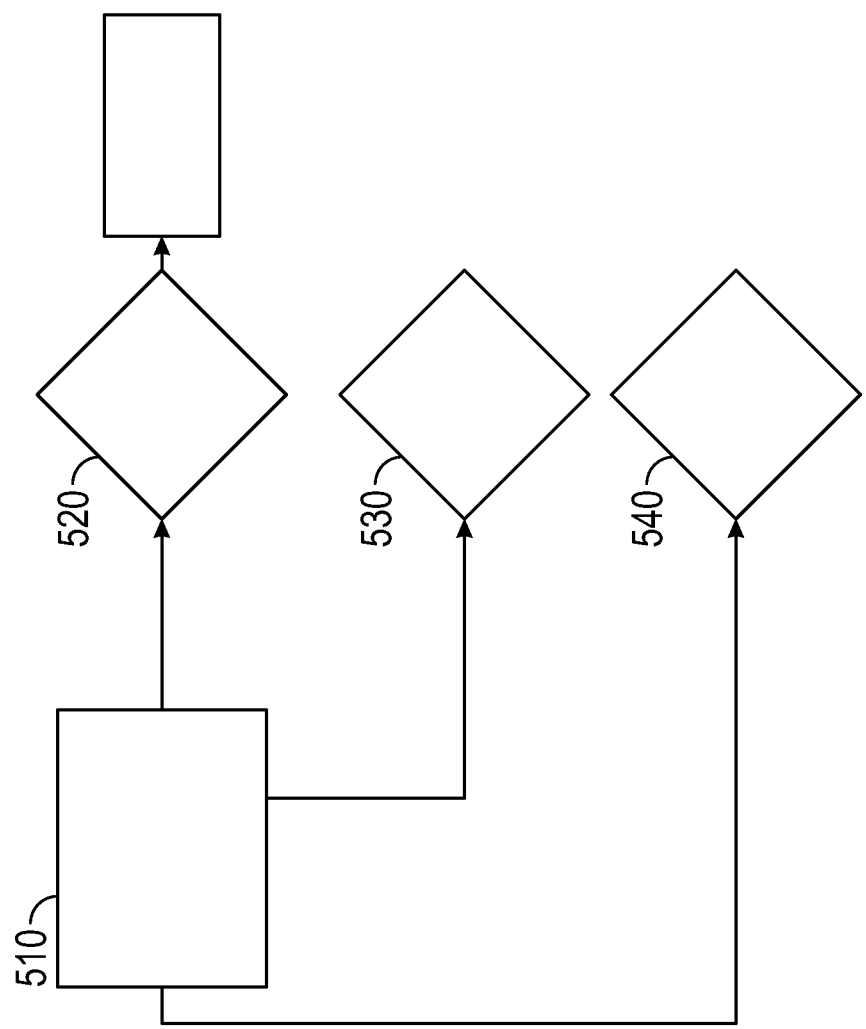
FIG. 5 illustrates an exemplary diagram of the QR code created to generate two different inter-domain configuration manager (IDCM) codes of the seamless multi-function pairing app system in accordance with an embodiment.

FIG. 5 illustrates an exemplary diagram of the QR code created to generate two different Infotainment Display Control Module (ICDM) codes in accordance with an embodiment. FIG. 5 shows a QR application configured for a seamless pairing app that generates two different QR codes for each ICDM. The QR app 510 enables the signal generated to a casting app to support CHROMECAST® for video content to be displayed on a display device 520 in Wi-Fi® 530 and/or BLUETOOTH® 540.

Figure 6:
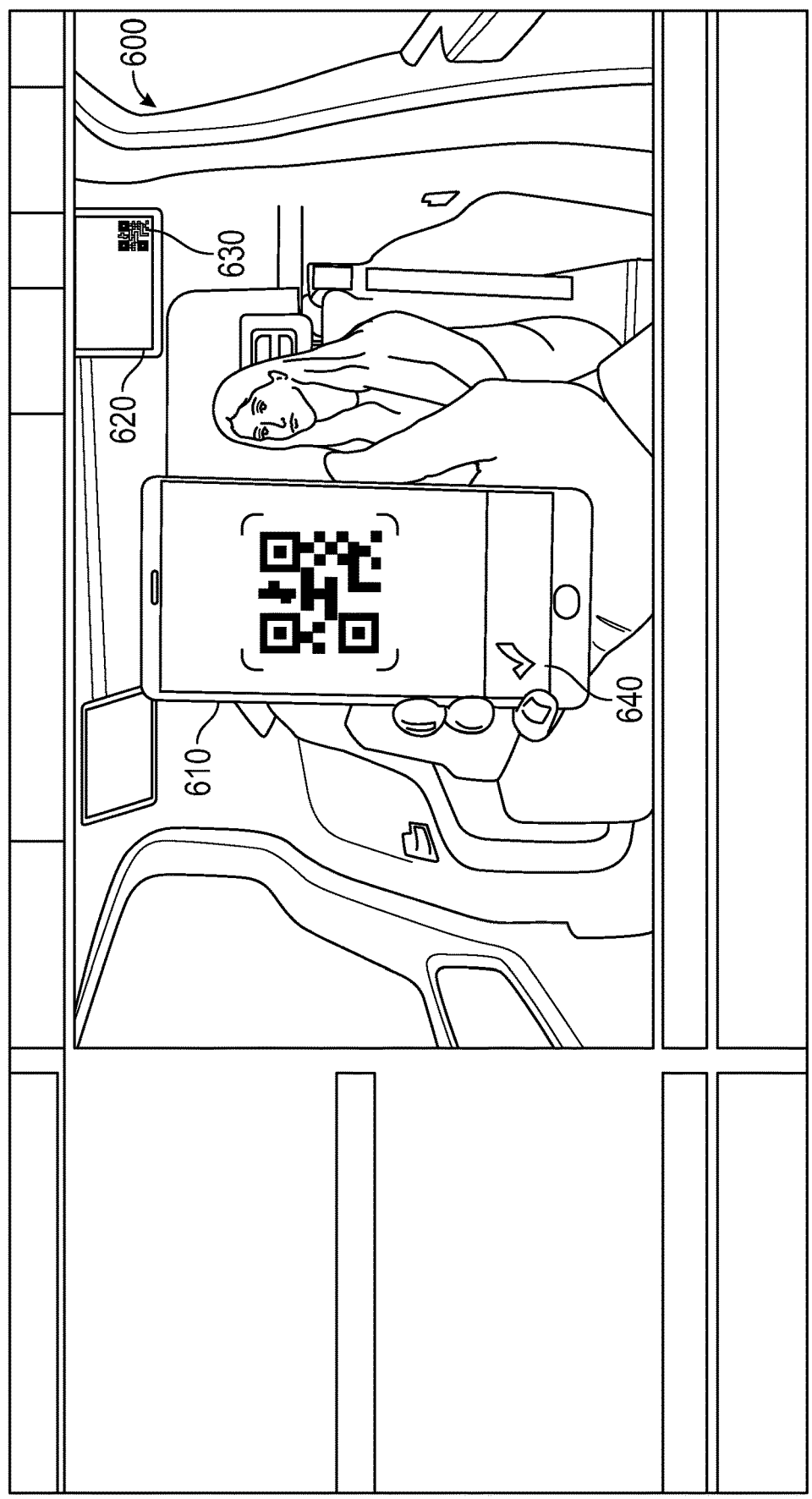
FIG. 6 illustrates a diagram of a mobile device held by a passenger in the vehicle capturing a QR code that is displayed on an in-vehicle display device of the seamless multi-function pairing app system, in accordance with an embodiment.

FIG. 6 illustrates a diagram of a mobile device held by a passenger in the vehicle capturing a QR code that is displayed on an in-vehicle display device, in accordance with an embodiment. In FIG. 6, in the interior 600 of an autonomous vehicle 100 (of FIG. 1), the mobile device 610 that is held by the passenger is positioned in a manner to capture the QR code 630 displayed in a display device 620 that is positioned in a direct view of the passenger who is seated in a forward position to view the display device 620. Upon the capture of the QR code 630, and the pairing of the Wi-Fi® and/or BLUETOOTH®, a notification message 640 is displayed on the display of the mobile device 610 to notify the passenger that the mobile device is paired with both or either the Wi-Fi® and/or BLUETOOTH® connections of the in-vehicle systems. If the passenger was wearing BLUETOOTH® enable headsets, the message would be able to notify the passenger that the headset is connected.

Figure 7:
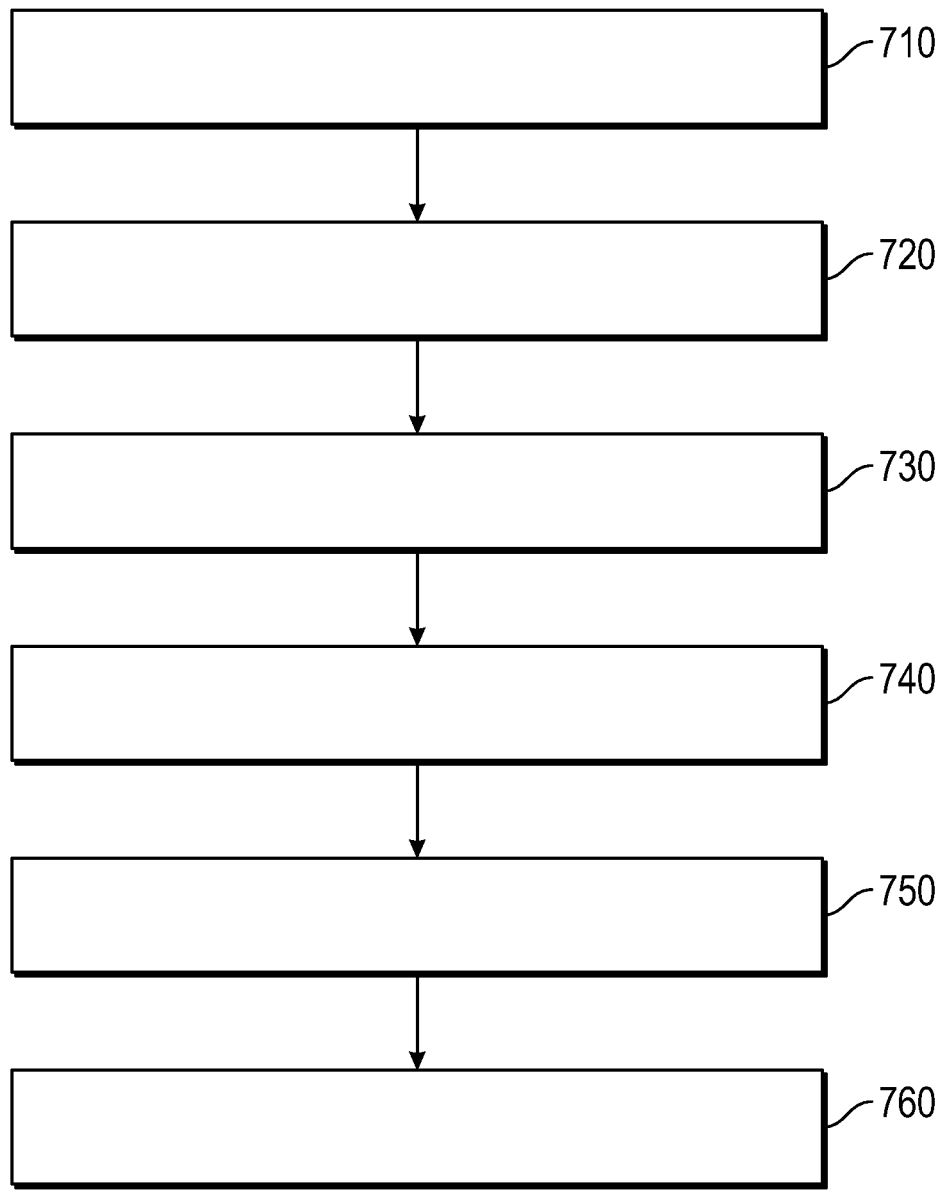
FIG. 7 illustrates an exemplary flowchart of the seamless pairing by a passenger mobile device to an in-vehicle system of an autonomous vehicle when requesting the rideshare using the seamless multi-function pairing app system in accordance with an embodiment.

FIG. 7 is an exemplary flowchart of the seamless pairing by a passenger in the autonomous vehicle when requesting the rideshare by the seamless pairing system in accordance with an embodiment. FIG. 7 includes the steps of to selectively pair an in-vehicle display to a mobile device used by a passenger with an in-vehicle display system when seated in the vehicle. At task 710, of receiving, by a processor of a vehicle, notification via a customer app of a customer request for a conveyance to a destination. At task 720, in response, to the customer entering the vehicle, initiating a pairing operation of communication systems of the vehicle with the customer based on the capture of the customer using the customer of a QR code displayed in the vehicle. At task 730, to display by a processor of a vehicle, at a display device selected from a plurality of display devices in the vehicle a QR code for capture by a mobile device used by a passenger in the vehicle.

The QR code displayed is at a select display device position in a direct view of the seated passenger within a predetermined distance that enables the passenger to the mobile device to capture the QR while in a seated position at a seated location in a vehicle. At task 740, in response to the passenger capturing using an app host by the passenger's mobile device, initiating a wireless connection with the passenger's mobile device wherein the wireless connection is a secure connection based on an identification of the passenger location in the vehicle. At task 750, the pairing the processor of the vehicle with the mobile device of the passenger to initiate a Wi-Fi® protocol communication for multi-casting a display from a media player hosted by the passenger's mobile device on the select display in the vehicle. At task 760, the pairing the processor of the vehicle with the mobile device of the passenger to initiate a BLUETOOTH® protocol communication for audio presentation on the passenger's mobile device. Finally, at task 770, for disengaging both the Wi-Fi® and/or BLUETOOTH® protocol communication when the passenger departs from the vehicle.

It should be appreciated that process of FIGS. 1-7 may include any number of additional or alternative tasks, the tasks shown in FIGS. 1-7 need not be performed in the illustrated order and process of the FIGS. 1-7 may be incorporated into a more comprehensive procedure or process having additional functionality not described in detail herein. Moreover, one or more of the tasks shown in FIGS. 1-7 could be omitted from an embodiment of the process shown in FIGS. 1-7 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method to selectively pair an in-vehicle display to a mobile device used by a passenger with an in-vehicle display system when seated in the vehicle, comprising:
receiving, by a processor of a vehicle, notification via a rideshare app of a request for a ride to a destination;
   in response, to the passenger entering the vehicle, initiating a pairing operation of a system of the vehicle with a passenger's mobile device based on capture by the passenger using the passenger's mobile device of a QR code displayed in the vehicle;
   displaying, by a processor of a vehicle, at a display device selected from a plurality of display devices in the vehicle a QR code for capture by the passenger's mobile device in the vehicle wherein the QR code displayed is at a select display device positioned in a direct view of a seated passenger within a predetermined distance that enables the passenger to operate the mobile device to capture the QR while in a seated position at an interior location in a vehicle;
   in response to the passenger capturing using an app host by the passenger's mobile device, initiating, by the processor, a wireless connection with the passenger's mobile device wherein the wireless connection is a secure connection based on an identification of the passenger and passenger location in the vehicle based on the QR code;
   pairing, by the processor, the vehicle system with the mobile device of the passenger to initiate a Wi-Fi protocol communication for multi-casting a display from a media player hosted by the passenger's mobile device on the select display in the vehicle based on the QR code;
   pairing, by the processor, the vehicle system with the mobile device of the passenger to initiate a BLUETOOTH protocol communication for audio presentation on the passenger's mobile device based on the QR code; and
   disengaging, by the processor, both Wi-Fi and BLUETOOTH protocol communication when the passenger departs from the vehicle.

2. The method of claim 1, further comprising:
determining, by the processor, that the passenger is departing the vehicle by data of a destination location of the vehicle based on GPS data generated by the passenger's mobile device.

3. The method of claim 2, further comprising:
determining, by the processor, that the passenger is departing the vehicle by data of the destination location of the vehicle based on navigation data received by the passenger's mobile device.

4. The method of claim 3, further comprising:
implementing, by the processor, based on information contained in the QR code a push connect operation for casting to the display device without a passenger select of the display device to viewed casted content.

5. The method of claim 4, further comprising:
configuring, by the processer, the QR code in a manner to enable a passenger to scan the QR within an intimate distance to the passenger that does not interfere with the intimate distance of any other passenger seated in the vehicle wherein the intimate distance is determined within an arms' reach of the passenger.

6. The method of claim 5, further comprising:
enabling, by the processor, a priority to connect either the Wi-Fi or the BLUETOOTH connection to the passenger mobile device with the in-vehicle system.

7. The method of claim 6, further comprising:
notifying, by the processor, the passenger by a message displayed on the passenger's mobile device that the Wi-Fi and BLUETOOTH connection is enabled.

8. A system comprising:
a processor configured to execute an in-vehicle system by an algorithm that implements an app to:
seamlessly operate a push connection to wirelessly connect to a passenger mobile device to enable casting of the passenger mobile device to a select display in the vehicle based on information contained in a QR code transferred to the passenger mobile device;
in response, to a passenger entering the vehicle, initiate a pairing operation of the in-vehicle system with the passenger mobile device based on a manual capture by the passenger using the app of a QR code displayed in the vehicle;
display at a display device selected from a plurality of display devices in the vehicle a QR code for capture by the passenger mobile device at a select display device positioned in a direct view of a seated passenger within a predetermined distance that enables the passenger to operate the passenger mobile device to capture the QR while in a seated position at a location in a vehicle;

in response to a passenger capture of the QR code using the app hosted by the passenger's mobile device, initiate a wireless connection with the passenger's mobile device wherein the wireless connection is a secure connection based on an identification of the passenger and passenger location in the vehicle based on the QR code;

pair the vehicle system with the mobile device of the passenger to initiate a Wi-Fi protocol communication for multi-casting a display from a media player hosted by the passenger's mobile device on the select display in the vehicle based on the QR code;

pair the vehicle system with the mobile device of the passenger to initiate a BLUETOOTH protocol communication for audio presentation on the passenger's mobile device based on the QR code; and disengage both Wi-Fi and BLUETOOTH protocol communication when the passenger departs from the vehicle.

9. The system of claim 8, further comprising:
determine that the passenger is departing the vehicle by data of a destination location of the vehicle based on navigation data received by the passenger mobile device.

10. The system of claim 9, further comprising:
determine that the passenger is departing the vehicle by data of the destination location of the vehicle based on navigation data received by the passenger mobile device.

11. The system of claim 10, further comprising:
implement by the information of the QR code a push operation to connect to cast content of the passenger mobile device to the display device.

12. The system of claim 11, further comprising:
configure the QR code to enable a passenger to scan the QR within an intimate distance of the passenger that does not interfere with the intimate distance of any other passenger seated in the vehicle wherein the intimate distance is determined as a distance no more than an arm's reach of the passenger.

13. The system of claim 12, further comprising:
enable a priority to connect the Wi-Fi or the BLUETOOTH connection to the passenger mobile device with the in-vehicle system.

14. The system of claim 13, further comprising:
notify the passenger by a message displayed on the passenger's mobile device that the Wi-Fi and BLUETOOTH connection is enabled.

15. A vehicle apparatus comprising:
a vehicle controller comprising a processor wherein the processor implements an algorithm to:
execute an in-vehicle system to seamless push connect to a passenger mobile device for enabling casting to a select display in the vehicle based on information generated in a QR code transferred to the passenger mobile device;

in response, to the passenger entering the vehicle, initiate a pairing operation of systems of the vehicle based on capture of a QR code displayed in the vehicle;

display at a display device selected from a plurality of display devices in the vehicle a QR code for capture by a mobile device used by a passenger in the vehicle wherein the QR code displayed is at a select display device positioned in a direct view of the seated passenger within a predetermined distance that enables the passenger to the mobile device to capture the QR while in a seated position at a location in a vehicle;

in response to the passenger capturing the QR code by the passenger's mobile device, initiate a wireless connection with the passenger's mobile device wherein the wireless connection is a secure connection based on an identification of the passenger and passenger location in the vehicle based on the QR code;

pair the passenger's mobile device to initiate a Wi-Fi protocol communication for multi-casting a display from a media player hosted by the passenger's mobile device on a select display in the vehicle based on the QR code;

pair the passenger's mobile device to initiate a BLUETOOTH protocol communication for audio presentation on the passenger's mobile device based on the QR code; and disengage both Wi-Fi and BLUETOOTH protocol communication when the passenger departs from the vehicle.

16. The vehicle apparatus of claim 15, further comprising:
the processor configured to:
determine that the passenger is departing the vehicle by data of a destination location of the vehicle based on navigation data received by the passenger mobile device.

17. The vehicle apparatus of claim 16, further comprising:
the processor configured to:
determine that the passenger is departing the vehicle by data of the destination location of the vehicle based on navigation data received by the passenger mobile device.

18. The vehicle apparatus of claim 17, further comprising:
the processor configured to:
implement by the information of the QR code push connect for casting to the display device.

19. The vehicle apparatus of claim 18, further comprising:
the processor configured to:
enable a priority to connect either the Wi-Fi or the BLUETOOTH connection to the passenger mobile device with the in-vehicle system.

20. The vehicle apparatus of claim 19, further comprising:
the processor configured to:
enable a priority to connect the Wi-Fi or the BLUETOOTH connection to the passenger's mobile device with the in-vehicle system.

* * * * *